(No Model.)

D. C. BEATY.
COMBINED SULKY PLOW, HARROW, SEEDER AND ROLLER.

No. 265,005. Patented Sept. 26, 1882.

WITNESSES:
Theo. G. Hoster
C. Sedgwick

INVENTOR:
D. C. Beaty
BY Munn &Co
ATTORNEYS.

UNITED STATES PATENT OFFICE.

DANIEL C. BEATY, OF OLYMPIA, WASHINGTON TERRITORY.

COMBINED SULKY-PLOW, HARROW, SEEDER, AND ROLLER.

SPECIFICATION forming part of Letters Patent No. 265,005, dated September 26, 1882.

Application filed April 1, 1882. (No model.)

*To all whom it may concern:*

Be it known that I, DANIEL C. BEATY, of Olympia, in the county of Thurston and Territory of Washington, have invented a new and Improved Combined Sulky-Plow, Harrow, Seeder, and Roller, of which the following is a full, clear, and exact description.

The invention consists of a machine having plowing, harrowing, seeding, and rolling attachments contrived to perform all these operations at once without allowing the horses to step on the plowed ground, all as hereinafter described.

Reference is to be had to the accompanying drawings, forming part of this specification, in which similar letters of reference indicate corresponding parts in both the figures.

Figure 1:
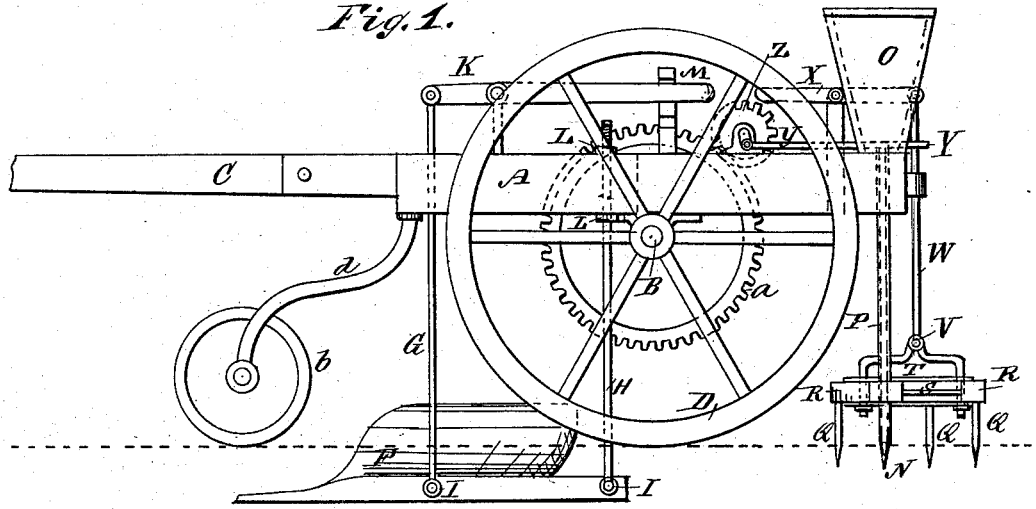
Figure 2:
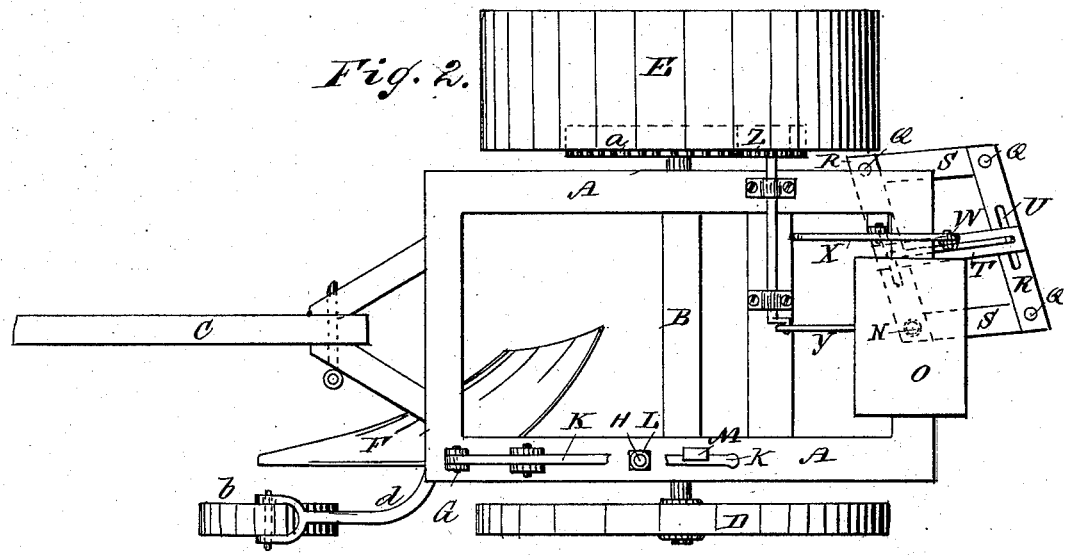

Figure 1 is a side elevation of the improved machine, and Fig. 2 is a plan view.

The frame A, of suitable size, and preferably of rectangular form, is mounted upon the axle B, midway or thereabout between the front and rear ends, and provided with a suitable tongue, C, for the horses.

The wheel D upon the land-side is of the ordinary truck or wagon wheel construction, but the wheel E, which passes over the plowed, seeded, and harrowed ground, is made about as wide in the tread as the furrow to be turned by the plow, to roll and smooth the surface as the other operations progress.

The plow F is located at the front left-hand corner of the frame, between the wheels, close to the line of the land-side wheel, and sufficiently distant from the roller-wheel to turn the furrow-slice between it and the said land-side wheel, and so that the roller-wheel will not pass over the slice until the next round, to allow the seeder and harrow to dress the furrow-slice before being rolled. The plow is suspended from the frame by the strong rods G H, both of which are pivoted to it by joints I, so that the point may be raised or lowered by the lever K, to which rod G is attached, while rod H is firmly secured to the frame at the required height by nuts L, which screw on the rod to adjust the plow for depth. The lever K is secured in the notches of the catch-standard M to secure the plow in the different positions.

Behind the plow, at the rear of the frame, and in the line or space between the plow and the roller E, into which the furrow-slice is turned by the plow, the harrow is located, and over one of the teeth of the latter, N, which is hollow, is a seed-hopper, O, from which a flexible tube, P, conducts the seed from the hopper to the tooth N, through which it is discharged into the drill made by said tooth. The other teeth, Q, of the harrow are solid, though one or more may be contrived the same as tooth N for drilling in the seed, if desired.

The frame of the harrow consists of the side bars, R, end bars, S, and middle cross-bar, T. The teeth are located at the corners, forming pivots whereon the end and side bars may be shifted to widen or narrow the harrow by the elongation of it in one of the diagonals, and the side bars are slotted at U for shifting the middle cross-bar for this purpose, by sliding its fastening-bolts along these slots in opposite directions. The harrow is jointed at V to the rod W, by which it is attached to the frame to allow it to rise and fall front and rear to the unevenness of the ground. The rod W is attached to the lever X by lifting it above the ground when required. More than one plow F may be connected with the frame, and a plain comb-harrow may also be used, if desired.

The seed-dropping is regulated by the slide Y, attached to the crank of the pinion Z, which is worked by a toothed wheel, $a$, bolted to the wheel-spokes to revolve with the wheels.

Before the wheel D there is a small wheel, $b$, to balance the frame on and to gage the working depth of the plow, said wheel being suitably supported in an arm, $d$, projecting forward and downward from the frame.

The machine thus arranged is simple and well-calculated for doing the several different operations together and by once passing over the ground, thus saving much time and labor, and also saving the treading of the plowed ground by the horses.

Having thus fully described my invention, I claim as new and desire to secure by Letters Patent—

1. The combination, with the frame A, provided with the plow F, arranged at the left-hand front corner, of the axle B, the land-side wheel D, and the roller E, adapted to run on the plowed ground and serve the double purpose of a wheel for the frame and a roller for the plowed land, substantially as described.

2. The combination, with the frame A, the plow F, arranged at the left-hand front corner of the said frame, and the axle B, carrying the land-side wheel D and the roller E, serving the double purposes of a roller and wheel, of the harrow Q R S T, arranged in rear of and between the plow and roller, substantially as and for the purpose set forth.

3. The combination, with the frame A and plow F, of the catch-standard M, the lever K, the rod G, pivoted to the lever and plow, and the rod H, adjustably secured to the frame at its upper end and pivoted to the plow at its lower end, substantially as and for the purpose set forth.

4. The combination, with the slotted harrow-frame bars R R and bars S S, pivoted together at their corners, of the cross-bar T, adjustably secured to the said slotted bars, substantially as and for the purpose set forth.

DANIEL CRANE BEATY.

Witnesses:
W. F. KEADY,
NATHAN S. PORTER.